Figure 1:
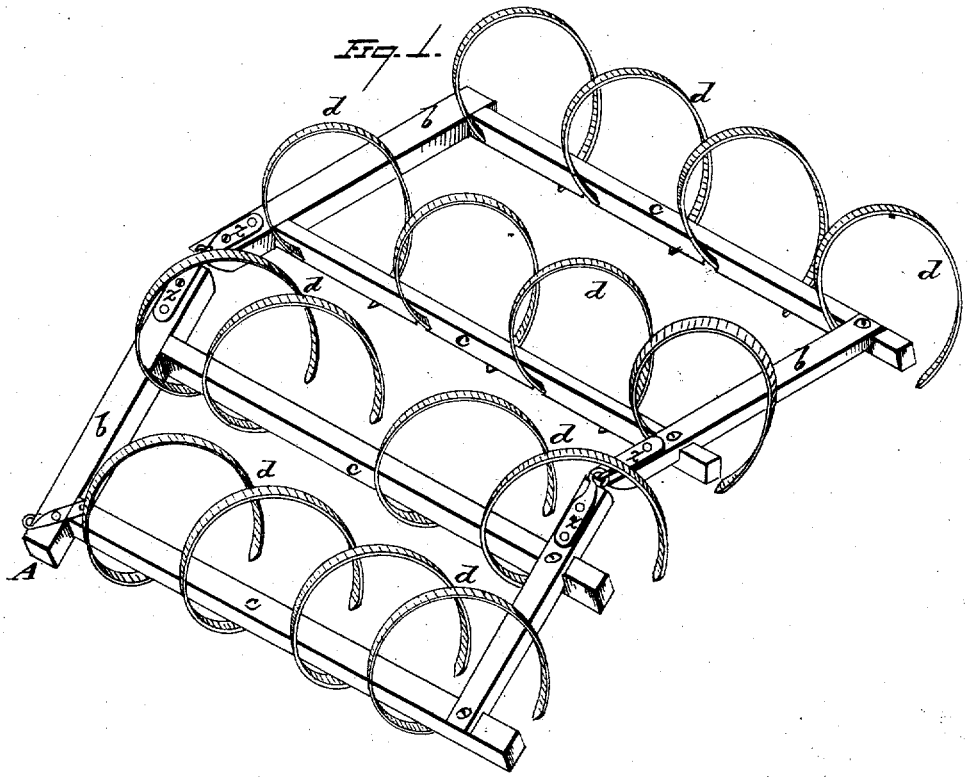

D. L. GARVER.

Harrow.

No. 8,142. Reissued March 26, 1878.

WITNESSES

Ed. L. Nottingham

A. M. Bright.

INVENTOR

David L. Garver.

By Leggett and Leggett.

ATTORNEY

THE NORRIS PETERS CO., PHOTO-LITHO., WASHINGTON, D. C.

UNITED STATES PATENT OFFICE.

DAVID L. GARVER, OF HART, MICHIGAN.

IMPROVEMENT IN HARROWS.

Specification forming part of Letters Patent No. 95,458, dated October 5, 1869; Reissue No. 8,142, dated March 26, 1878; application filed August 31, 1877.

*To all whom it may concern:*

Be it known that I, DAVID L. GARVER, of Hart, in the county of Oceana and State of Michigan, have invented a certain new and useful Improvement in Harrows, of which the following is a specification:

My invention relates to improvements in harrows, and more particularly to making the teeth of the harrow of such form that, when attached to an ordinary frame, there shall be a portion intermediate between the point of attachment of the tooth and the point of contact with the ground which shall spring and yield to inequalities upon the surface of the ground without disturbing the other teeth of the harrow, and without lifting the harrow from the ground.

The objects accomplished by my invention are the following: When a tooth strikes any solid substance it rebounds or springs back and upward, thereby clearing the substance, and immediately enters the ground again without interfering with the working of the other teeth. Frequent clogging is avoided, and the harrow can be moved from place to place as readily as a common sled by simply turning it over.

In the drawing is represented a harrow embodying the principle of my invention.

Figure 2:
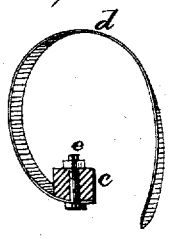
Figure 3:
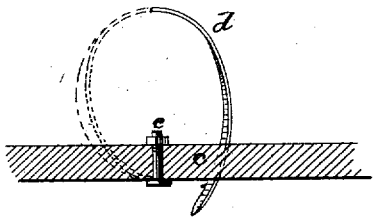

Figure 1 is a perspective view of a harrow provided with my improved harrow-teeth. Fig. 2 is a transverse sectional view of a beam of a harrow-frame, showing one of the teeth and its fastening. Fig. 3 is a longitudinal sectional view of a bar of the frame, also showing a tooth and its fastening.

A is a common harrow-frame, constructed lighter than the ordinary teeth require it to be, and provided with hinges *z* at the sides *b*. *c* are bars, to the under side of which the teeth *d* are attached.

In the instance shown in the drawing the teeth *d* are made of spring-steel, about four feet in length, two inches in width, and one-fourth of an inch in thickness, having their points swaged in the shape of common cultivator-teeth. The teeth are then bent in a circular shape, their points being about eight inches to the rear, and extending about five or six inches below their ends. Their ends are fastened to the bar *c* by being let into the bar on the under side, so as to be even with the under surface, and are there firmly held by one or more iron bolts, *e*, provided with nut and screw, as shown in Figs. 2 and 3.

The points of the teeth incline forward, and extend five or six inches below the under side of the frame. The dimensions of the teeth depend entirely upon the nature of the soil for which they are intended. If used in light sandy soil, they may be constructed shorter; if in a clay soil, they should be stiffer; and if in rough, rooty, stony ground, they should be longer than I have described them.

The shape or kind of frame, or the number of teeth used, are matters of choice. Sixteen teeth are enough for a medium-sized harrow.

The construction of the teeth admits of the frame being made lighter than the frame of an ordinary harrow. Their points incline forward. They have a tendency to enter the ground when the harrow is drawn, and this tendency obviates the necessity of a heavy frame.

The size and shape of the teeth may be varied considerably without departing from the principle of my invention, which contemplates broadly a harrow provided with teeth, fastened at one end of the frame, but so formed between the point of attachment to the frame and the point of contact with the ground that it will spring or yield so as to pass over lumps or obstacles without injury to the tooth itself, and without disturbing the operation of the other teeth of the harrow.

What I claim is—

1. A spring-metal harrow-tooth attached to the harrow-frame, and curved so that the main portion of the tooth shall be located above the horizontal plane of the lower surface of said harrow-frame, substantially as described.

2. A harrow-tooth of spring metal, curved upward from its point of attachment to the harrow-frame, thence rearward over the same, and downward to its point of contact with the ground, substantially as set forth.

3. A harrow-tooth made of spring metal, curved forward and upward in an arch extending well above the horizontal plane of its attachment to the harrow-frame, and free from contact therewith, except on the lower side of the bar supporting said tooth, substantially as set forth.

In testimony whereof I have hereunto signed my name in the presence of two subscribing witnesses.

DAVID L. GARVER.

Witnesses:
WILLIAM S. MCKINNEY,
ELBERT S. ROOS.